United States Patent
Maeda et al.

(10) Patent No.: US 11,220,004 B2
(45) Date of Patent: Jan. 11, 2022

(54) ROBOT SYSTEM

(71) Applicant: KABUSHIKI KAISHA YASKAWA DENKI, Kitakyushu (JP)

(72) Inventors: Yoshie Maeda, Kitakyushu (JP); Yosuke Kamiya, Kitakyushu (JP); Sohei Oga, Kitakyushu (JP); Ryo Ozono, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 87 days.

(21) Appl. No.: 16/776,406

(22) Filed: Jan. 29, 2020

(65) Prior Publication Data

US 2020/0238516 A1    Jul. 30, 2020

(30) Foreign Application Priority Data

Jan. 30, 2019 (JP) .............................. JP2019-013896

(51) Int. Cl.
*B25J 9/16* (2006.01)
*B25J 9/10* (2006.01)

(52) U.S. Cl.
CPC ............ *B25J 9/1633* (2013.01); *B25J 9/106* (2013.01)

(58) Field of Classification Search
CPC .................... B25J 9/1633; B25J 9/106; G05B 2219/39195; G05B 2219/39199; G05B 2219/41025
See application file for complete search history.

(56) References Cited

U.S. PATENT DOCUMENTS

| 5,796,229 | A | 8/1998 | Akeel | |
| 2002/0143435 | A1* | 10/2002 | Terada | B23K 26/0884 700/245 |
| 2014/0009100 | A1 | 1/2014 | Sera | |
| 2017/0028554 | A1* | 2/2017 | Gomi | B25J 13/088 |
| 2017/0334067 | A1 | 11/2017 | Swarup et al. | |

FOREIGN PATENT DOCUMENTS

| EP | 0941815 | 9/1999 |
| JP | 2017-226030 | 12/2017 |

OTHER PUBLICATIONS

Sciavicco, "PD Control with Gravity Compensation", Robotics: modelling, planning and control, Feb. 6, 2009, pp. 345-348, XP055712425, Springer, UK.
Kubus et al., "Improving Force Control Performance by Computational Elimination of Non-Contact Forces/Torques", IEEE International Conference on Robotics and Automation, May 19, 2008, pp. 2617-2622, XP031340551, Pasadena, CA, USA.
Extended European Search Report for corresponding EP Application No. 20153090.4-1205, dated Aug. 17, 2020.

* cited by examiner

*Primary Examiner* — Dale Moyer
(74) *Attorney, Agent, or Firm* — Mori & Ward, LLP

(57) ABSTRACT

A robot system includes a work apparatus, a robot, and control circuitry. The work apparatus is configured to move a work module relatively to the work apparatus. The work module is configured to perform work. The work apparatus is connected the robot. The control circuitry is configured to control the robot to move so as to reduce a force generated by moving the work module by the work apparatus.

20 Claims, 10 Drawing Sheets

FIG. 7

| Axis | S axis (A0) | L axis (A1) | U axis (A2) | B axis (A4) |
|---|---|---|---|---|
| Gain | g0 | g1 | g2 | g3 |
| First variable | Lx | Lx | — | $\beta$ |
| Second variable | $\alpha$ | $\alpha$ | — | $\alpha$ |

ROBOT SYSTEM

CROSS-REFERENCE TO RELATED APPLICATIONS

The present application claims priority under 35 U.S.C. § 119 to Japanese Patent Application No. 2019-013896, filed Jan. 30, 2019. The contents of this application are incorporated herein by reference in their entirety.

BACKGROUND

Field of the Invention

The embodiments disclosed herein relate to a robot system.

Discussion of the Background

JP 2017-226030A discloses a work apparatus that includes a work module and a drive mechanism. The work module is an end effector, such as a laser machining device, of a robot. The drive mechanism moves the work module. In a work apparatus, if a drive mechanism of a work module moves at high speed, the force of the movement of the work module against the robot may cause vibrations, leaving a possibility of degraded accuracy of the work apparatus's work.

In light of the above considerations, the work apparatus recited in JP 2017-226030A includes, in addition to the work module, a movable anchor member that is movable in the direction opposite to the movement direction of the work module, in an attempt to eliminate or minimize the force of the work module against the robot. In JP 2017-226030A, the force of the work module against the robot is referred to as "movement reaction force".

SUMMARY

According to one aspect of the present disclosure, a robot system includes a work apparatus, a robot, and control circuitry. The work apparatus is configured to move a work module relatively to the work apparatus. The work module is configured to perform work. The work apparatus is connected the robot. The control circuitry is configured to control the robot to move so as to reduce a force generated by moving the work module by the work apparatus.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 7 illustrates example gain changes;

DESCRIPTION OF THE EMBODIMENTS

By referring to the accompanying drawings, a robot system according to an embodiment will be described in detail below. It is noted that the following embodiment is provided for example purposes only and are not intended for limiting purposes. The following description is mainly regarding a case where the work apparatus supported by the robot performs laser machining such as cutting and patterning a workpiece. Laser machining, however, is not intended in a limiting sense, other possible examples including spraying liquid and/or gas, coating, and welding.

As used herein, the term "orthogonal" means, in a broad sense, exactly orthogonal or approximately orthogonal within some tolerance from exactly orthogonal. As used herein, the term "perpendicular" means, in a broad sense, exactly perpendicular or approximately perpendicular within some tolerance from exactly perpendicular. As used herein, the term "parallel" means, in a broad sense, exactly parallel or approximately parallel within some tolerance from exactly parallel. As used herein, the term "vertical" means, in a broad sense, exactly vertical or approximately vertical within some tolerance from exactly vertical. As used herein, the term "same" means, in a broad sense, exactly the same or approximately the same within some tolerance from exactly the same. As used herein, the term "identical" means, in a broad sense, exactly identical or approximately identical within some tolerance from exactly identical. Thus, these terms are used taking into consideration production-related, installation-related, processing-related, and detection-related tolerances and errors.

Figure 1:
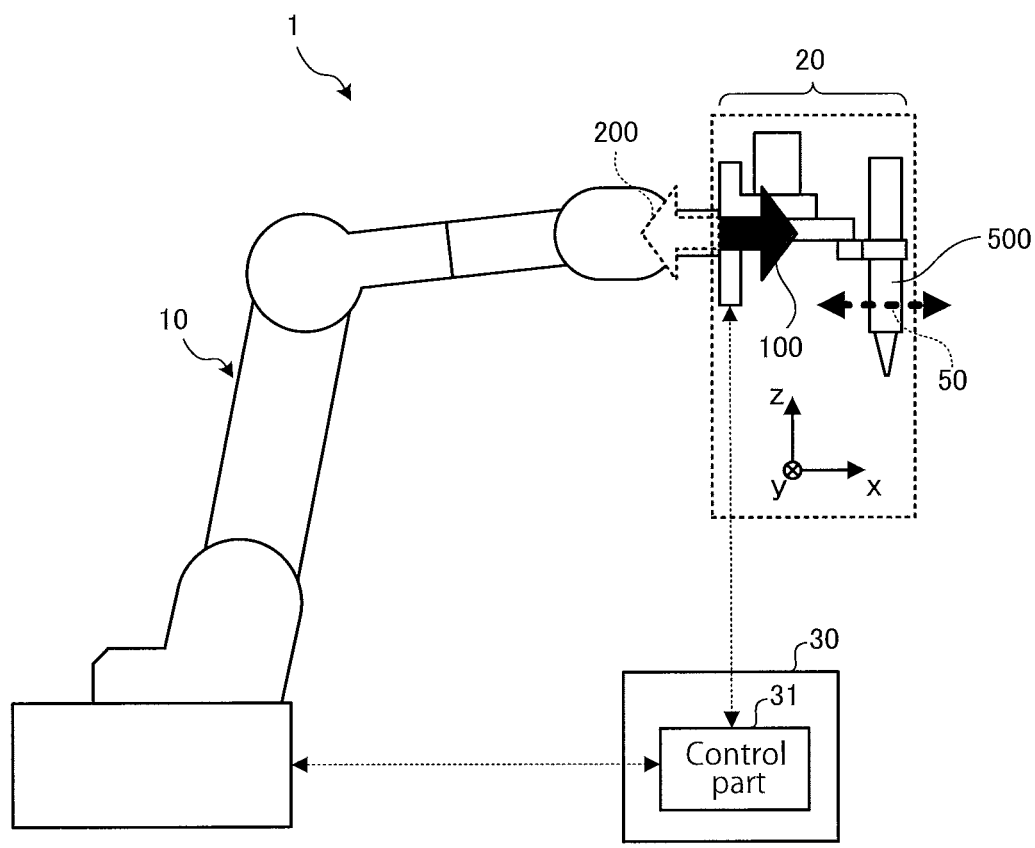
FIG. 1 illustrates an overview of a robot system according to an embodiment.

A robot system 1 according to this embodiment will be outlined by referring to FIG. 1. FIG. 1 illustrates an overview of the robot system 1 according to this embodiment.

For ease of description, FIG. 1 illustrates an "XYZ coordinate system" ("X", "Y", and "Z" are upper-case alphabets). The XYZ coordinate system is a three-dimensional orthogonal coordinate system fixed to a robot 10, and has Z axis whose vertically upward direction is assumed the positive direction.

FIG. 1 also illustrates an "xyz coordinate system" ("x", "y", and "z" are lower-case alphabets). The xyz coordinate system is a three-dimensional orthogonal coordinate system fixed to a work apparatus 20. The "XYZ coordinate system" and/or "xyz coordinate system" may also appear in some of the other drawings.

As illustrated in FIG. 1, the robot system 1 includes the robot 10, the work apparatus 20, and a controller 30. The robot 10 supports the work apparatus 20. The work apparatus 20 is mounted on the robot 10 and performs work while moving a work module 500 relative to the work apparatus 20. That is, the robot 10 supports the work apparatus 20 and moves the work apparatus 20 (mounted on a leading end portion of the robot 10) to a desired work position on a workpiece. As used herein, the term "leading end portion" of the robot 10 is intended to include the end of the robot 10 on the work apparatus 20 side and a portion offset from and proximate to the end of the robot 10 on the work apparatus 20 side.

The controller 30 performs synchronization control between the robot 10 and the work apparatus 20. As used herein, the term "synchronization control" refers to: control to synchronously output motion commands to the robot 10 and the work apparatus 20; or control to synchronize feedback control with respect to the robot 10 or the work apparatus 20.

The controller 30 includes a control part (control circuitry) 31. The control part 31 controls the robot 10 to make a motion (canceling motion 200) that cancels the force, 100, of the work module 500 against the robot 10 when the work module 500 makes a relative movement 50 relative to the work apparatus 20.

In FIG. 1, broken lines with solid arrows are used to indicate that the control part 31 is mutually communicable with the robot 10 and the work apparatus 20. These broken lines, however, are not intended to show physical communication lines that may be used in actual situations. A possible example is that a communication line is connected between the controller 30 and the robot 10, and another communication line is passed through the robot 10 and connected to the work apparatus 20. Another possible example is that the controller 30 is wirelessly communicable with the robot 10 and/or the work apparatus 20.

It is to be noted that a detailed configuration of the robot 10 will be described later by referring to FIG. 2; a detailed configuration of the work apparatus 20 will be described later by referring to FIGS. 3 and 4; and a detailed configuration of the controller 30 will be described later by referring to FIG. 5.

In the example illustrated in FIG. 1, the relative movement 50 of the work module 500 is along X-Y plane; the force 100 against the robot 10 is pointed in the positive X direction; and the canceling motion 200 of the robot 10 is pointed in the negative X direction. This example, however, is provided for exemplary purposes and is not intended in a limiting sense.

That is, in the robot system 1 according to this embodiment, the robot 10 makes a motion that eliminates or minimizes vibrations caused when the work apparatus 20 moves. This ensures that such vibrations are eliminated or minimized no matter which direction in the xyz coordinate system the relative movement 50 of the work module 500 is pointed in, since the robot 10 makes a motion in the XYZ coordinate system in a direction to cancel the force 100 of the relative movement 50.

Thus, the robot system 1 illustrated in FIG. 1 controls the robot 10 to make a motion that cancels the force 100 against the robot 10 when the force 100 is caused to occur by a motion of the work apparatus 20. This prevents the force 100 from making the robot 10 vibrate. With no or minimized vibrations of the robot 10, the work apparatus 20 is kept from being moved out of position. This eliminates or minimizes degradation of the accuracy with which the work apparatus 20 performs work.

Also, the robot system 1 illustrated in FIG. 1 eliminates the need for providing the work apparatus 20 with an additional mechanism such as an anchor member and a vibration proof mechanism, making the work apparatus 20 smaller in size and weight. This increases the accuracy with which the work apparatus 20 performs work without providing the work apparatus 20 with an additional mechanism. It is to be noted that this embodiment is mainly regarding a case where the direction in which the relative movement 50 of the work module 500 is pointed is parallel to the x-y plane.

An example configuration of the robot 10 will be described by referring to FIG. 2. FIG. 2 is a side view of the robot 10. FIG. 2 illustrates the XYZ coordinate system illustrated in FIG. 1. Similarly to FIG. 1, the side view in FIG. 2 is as seen from the negative Y side.

Figure 2:
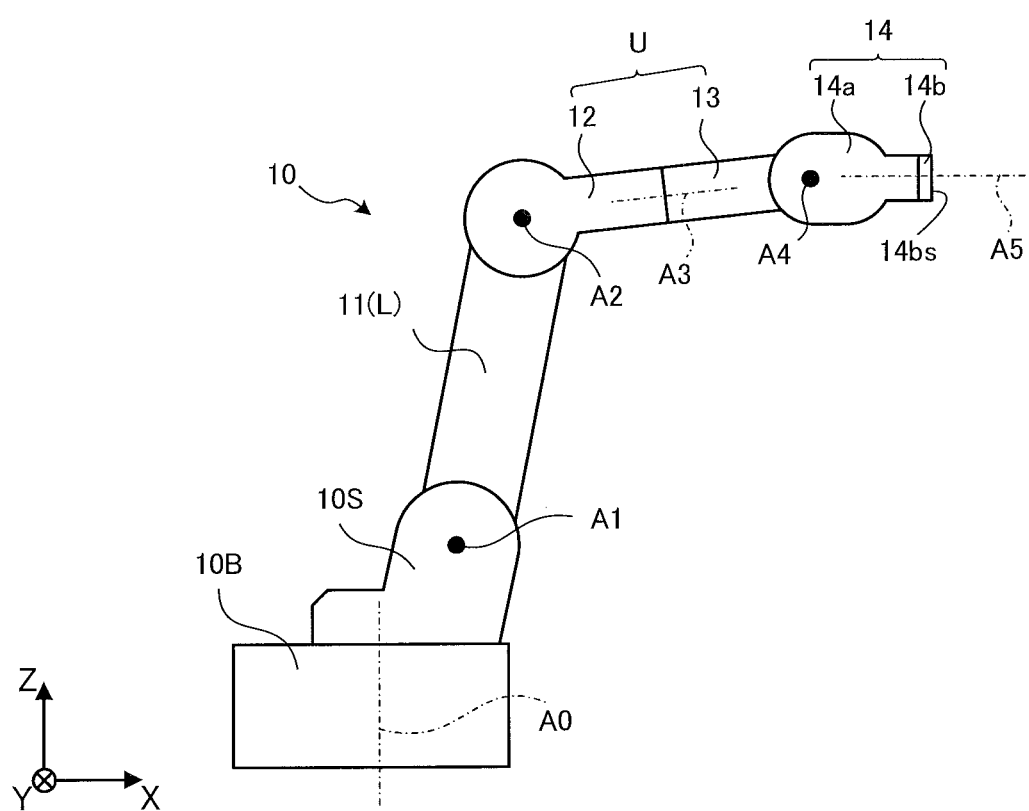
FIG. 2 is a side view of a robot of the robot system.

As illustrated in FIG. 2, the robot 10 is a vertical multi-articular robot having six axes, namely, vertical axis A0, first axis A1, second axis A2, third axis A3, fourth axis A4, and fifth axis A5. The robot 10 includes (in increasing order of distance from a base end portion of the robot 10) a base 10B, a swingable member 10S, a first arm 11, a second arm 12, a third arm 13, and a wrist 14. In the following description, the first arm 11 may occasionally be referred to as "lower arm L", and the second arm 12 and the third arm 13 may occasionally be referred to as "upper arm U".

The base 10B is disposed on an installation surface such as a floor surface. The swingable member 10S is supported by the base 10B and is turnable about the vertical axis A0, which is perpendicular to the installation surface. The first arm 11 is supported by the swingable member 10S and is swingable about the first axis A1, which is perpendicular to the vertical axis A0. The second arm 12 is supported by the first arm 11 and is swingable about the second axis A2, which is parallel to the first axis A1. While in the example illustrated in FIG. 2 the vertical axis A0 is the joint axis closest to the base end portion of the robot 10, the joint axis may not necessarily be pointed in a vertical direction. That is, the joint axis closest to the base end portion of the robot 10 may be pointed in any other direction. As used herein, the term "base end portion" of the robot 10 is intended to include the end of the robot 10 on the installation surface side and a portion offset from and proximate to the end of the robot 10 on the installation surface side.

The third arm 13 is, at its base end portion, supported by the second arm 12, and is turnable about the third axis A3, which is perpendicular to the second axis A2. The wrist 14 includes a swingable member 14a and a rotatable member 14b. The swingable member 14a is, at its base end portion, supported by a leading end portion of the third arm 13, and is swingable about the fourth axis A4, which is parallel to the second axis A2. The rotatable member 14b is, at its base end portion, supported by a leading end portion of the swingable member 14a, and is rotatable about the fifth axis A5, which is orthogonal to the fourth axis A4.

In the following description, a joint axis movable without changing its angle relative to an adjacent arm will be referred to as "turning axis", and a joint axis movable while changing is angle relative to an adjacent arm will be referred to as "swinging axis". In the robot 10 illustrated in FIG. 2, the vertical axis A0, the third axis A3, and the fifth axis A5 are turning axes, and the first axis A1, the second axis A2, and the fourth axis A4 are swinging axes.

The wrist 14 has a receiving surface 14bs at a leading end portion of the wrist 14 (a leading end portion of the rotatable member 14b). To the receiving surface 14bs, an end effector variable depending on the type of work is detachably fixed. This embodiment is mainly regarding a case where the work apparatus 20 illustrated in FIG. 1 is mounted on the receiving surface 14bs. It is to be noted that in the robot 10 illustrated in FIG. 2, the fifth axis A5 corresponds to the "joint axis of the robot 10 closest to the work apparatus 20".

Making the robot 10 a vertical multi-articular robot as illustrated in FIG. 2 enables the robot 10 to deal with the force 100 (see FIG. 1) by making a motion, even though the force 100 has a multiplicity of degrees of freedom and is a moment as well.

While in FIG. 2 the robot 10 is a six-axis vertical multi-articular robot, the robot 10 may have equal to or less than five axes or equal to or more than seven axes. In another possible example, the robot 10 may be a horizontal multi-articular robot. In this case, the direction in which the relative movement 50 of the work module 500 is pointed is preferably parallel to the X-Y plane (horizontal surface).

That is, the robot 10 may have any axis configuration that enables the robot 10 to make a motion in a direction to cancel the force 100 (force and moment), which is caused by a motion of the work module 500. By making the robot 10 a robot having six axes as illustrated in FIG. 2, the robot 10 is capable of dealing with the force 100 (force and moment), which has six degrees of freedom, by making a motion of six degrees of freedom.

An example configuration of the work apparatus 20 will be described by referring to FIGS. 3 and 4. FIG. 3 is a side view of the work apparatus 20, and FIG. 4 is a schematic illustrating a link configuration of the work apparatus 20. FIGS. 3 and 4 each illustrate the xyz coordinate system illustrated in FIG. 1. Similarly to FIG. 1, the side view in FIG. 3 is as seen from the negative y side, and the top view in FIG. 4 is as seen from the positive z side.

Figure 3:
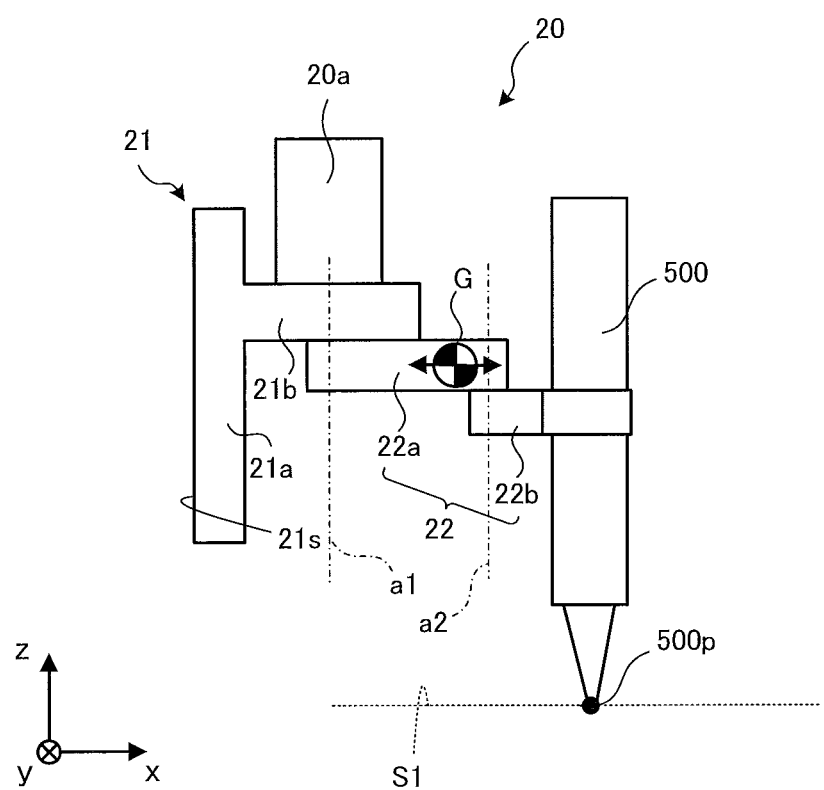
FIG. 3 is a side view of a work apparatus of the robot system.

A side configuration of the work apparatus 20 will be first described by referring to FIG. 3. As illustrated in FIG. 3, the work apparatus 20 includes driving members 20a, a body 21, and a horizontal link mechanism 22. Specifically, the work apparatus 20 includes two driving members 20a, and the horizontal link mechanism 22 forms a "closed link", which will be detailed later by referring to FIG. 4.

The work apparatus 20 supports the work module 500 via the horizontal link mechanism 22. A non-limiting example of the work module 500 is a machining or processing module that machines or processes a workpiece by radiating laser to the workpiece. It is to be noted that the work apparatus 20 may be regarded as a combination of the work apparatus 20 and the work module 500.

As illustrated in FIG. 3, the work module 500 has a representative point 500p at a leading end portion of the work module 500, which is located on the negative z side. It is to be noted, however, that the representative point 500p may be located at another position on the work module 500, or that the representative point 500p may be located at a position away from the work module 500 by a predetermined distance.

As illustrated in FIG. 3, the work apparatus 20 supports the work module 500 and moves the representative point 500p of the work module 500 along a first plane S1. Also, the work apparatus 20 is mounted on the receiving surface 14bs of the robot 10 such that the fifth axis A5, which is the joint axis of the robot 10 closest to the work apparatus 20 (illustrated in FIG. 2), is parallel to the first plane S1.

Thus, the work apparatus 20 on the robot 10 is oriented in a particular direction relative to the robot 10. This configuration reduces the load involved in the calculation of the force 100 (see FIG. 1) against the robot 10. The above configuration also eliminates or minimizes the influence that the force 100 (which is caused when the work apparatus 20 moves) has on the joint axis of the robot 10 closest to the work apparatus 20 (the fifth axis A5 illustrated in FIG. 2), increasing the accuracy with which the work apparatus 20 performs work.

A configuration of the work apparatus 20 will be described in more detail below. The driving members 20a is a rotational actuator, such as a servo motor, that drives the horizontal link mechanism 22. While in this embodiment the driving members 20a is a rotational actuator such as a servo motor, the driving members 20a may be another type of actuator such as a linear motion actuator.

The body 21 includes a received member 21a and a support member 21b. The received member 21a has a received surface 21s. The received surface 21s is parallel to y-z plane illustrated in FIG. 3. With the received surface 21s in contact with the receiving surface 14bs of the robot 10 (see FIG. 2), the work apparatus 20 is mounted on the robot 10. Since the receiving surface 14bs of the robot 10 is perpendicular to the fifth axis A5 (see FIG. 2) of the robot 10, the received surface 21s of the work apparatus 20 is also perpendicular to the fifth axis A5.

The support member 21b supports the driving members 20a and a base end portion of the horizontal link mechanism 22, which is driven by the driving members 20a. The horizontal link mechanism 22 includes a first link 22a and a second link 22b. The first link 22a is, at its base end portion, supported by the body 21 and is swingable about a drive axis a1, which extends along the z axis.

The second link 22b is, at its base end portion, supported by a leading end portion of the first link 22a, and is swingable about a passive axis a2, which is parallel to the drive axis a1. Also, the second link 22b detachably supports the work module 500. That is, the horizontal link mechanism 22, which is driven by the driving members 20a, moves the representative point 500p of the work module 500 along the first plane S1, which is parallel to the x-y plane. In FIG. 4, swinging motions about the drive axis a1 are indicated by double-arrow headed solid lines, and swinging motions about the passive axis a2 are indicated by double-arrow headed broken lines.

Thus, the horizontal link mechanism 22 limits the track of movement of the representative point 500p of the work module 500 on the first plane S1. Using such mechanism reduces the load involved in the calculation of the force 100 (see FIG. 1) against the robot 10, which is caused when the work apparatus 20 moves. It is to be noted that the track of movement of the representative point 500p may take any of various shapes such as a circular shape, an elliptical shape, and a rectangular shape.

FIG. 3 illustrates the center of gravity, G, of the work apparatus 20 combined with the work module 500. If the representative point 500p of the work module 500 is moved along the first plane S1, the center of gravity G moves on a plane parallel to the first plane S1. As a result, the force 100 illustrated in FIG. 1 acts on the robot 10.

When the fifth axis A5 (see FIG. 2) is located on the plane on which the center of gravity G moves (plane parallel to the first plane S1), the influence that the movement of the center of gravity G has on turning motions about the fifth axis A5 is eliminated or minimized. In other words, as the distance between the fifth axis A5 and the plane on which the center of gravity G moves is smaller, the influence that the movement of the center of gravity G has on the fifth axis A5 is smaller.

A link configuration of the work apparatus 20 will be described by referring to FIG. 4. As illustrated in FIG. 4, the work apparatus 20 includes two drive axes a1 and three passive axes A2. The drive axes a1 are directly driven by driving forces from the respective driving members 20a, illustrated in FIG. 3. In contrast, the passive axes A2 are driven passively through links.

Specifically, the work apparatus 20 includes the two drive axes a1 at a base end portion of the work apparatus 20. Each drive axis a1 is connected with the base end portion of a first link 22a, and a passive axis a2 is connected to the leading end portion of the first link 22a. Each passive axis a2 is connected with the base end portion of a second link 22b, and a leading end portion of the second link 22b is connected to a common passive axis a2. The representative point 500p is located at a position offset from one of the second links 22b (in FIG. 4, the representative point 500p is located on a link fixed to one second link 22b). It is to be noted that the representative point 500p may be located on a link fixed to the other second link 22b.

Thus, the work apparatus 20 has a closed link configuration of five joints connected to each other. Also, the drive axis a1 and the passive axis a2 of the work apparatus 20 are parallel to the z axis, and two drive axes a1 are provided. That is, the work apparatus 20 has two degrees of freedom on the x-y plane. This ensures that the representative point 500p is movable to any desired position along the x-y plane.

Figure 4:
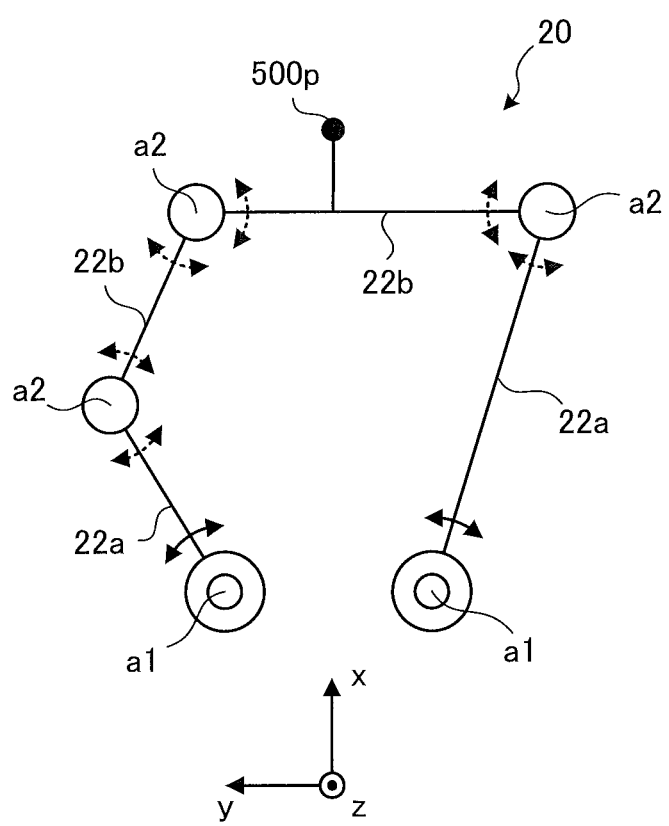
FIG. 4 is a schematic illustrating a link configuration of the work apparatus.

While the link mechanism illustrated in FIG. 4 is a closed link mechanism, an open link mechanism may be used, instead of a closed link mechanism. This will be described later by referring to FIG. 10. Also, while in FIG. 4 the representative point 500p is located at a position offset from one of the second links 22b, the representative point 500p may be located on one of the second links 22b. Another possible example is that the representative point 500p is located at a position offset from one of the first links 22a or located on one of the first links 22a. Another possible example is that the representative point 500p is located on one of the passive axes a2.

A configuration of the robot system 1 according to the embodiment will be described by referring to FIG. 5. FIG. 5 is a block diagram illustrating a configuration of the robot system 1. As illustrated in FIG. 5, the robot system 1 includes the robot 10, the work apparatus 20, and the controller 30. The robot 10 and the work apparatus 20 are connected to the controller 30.

Figure 5:
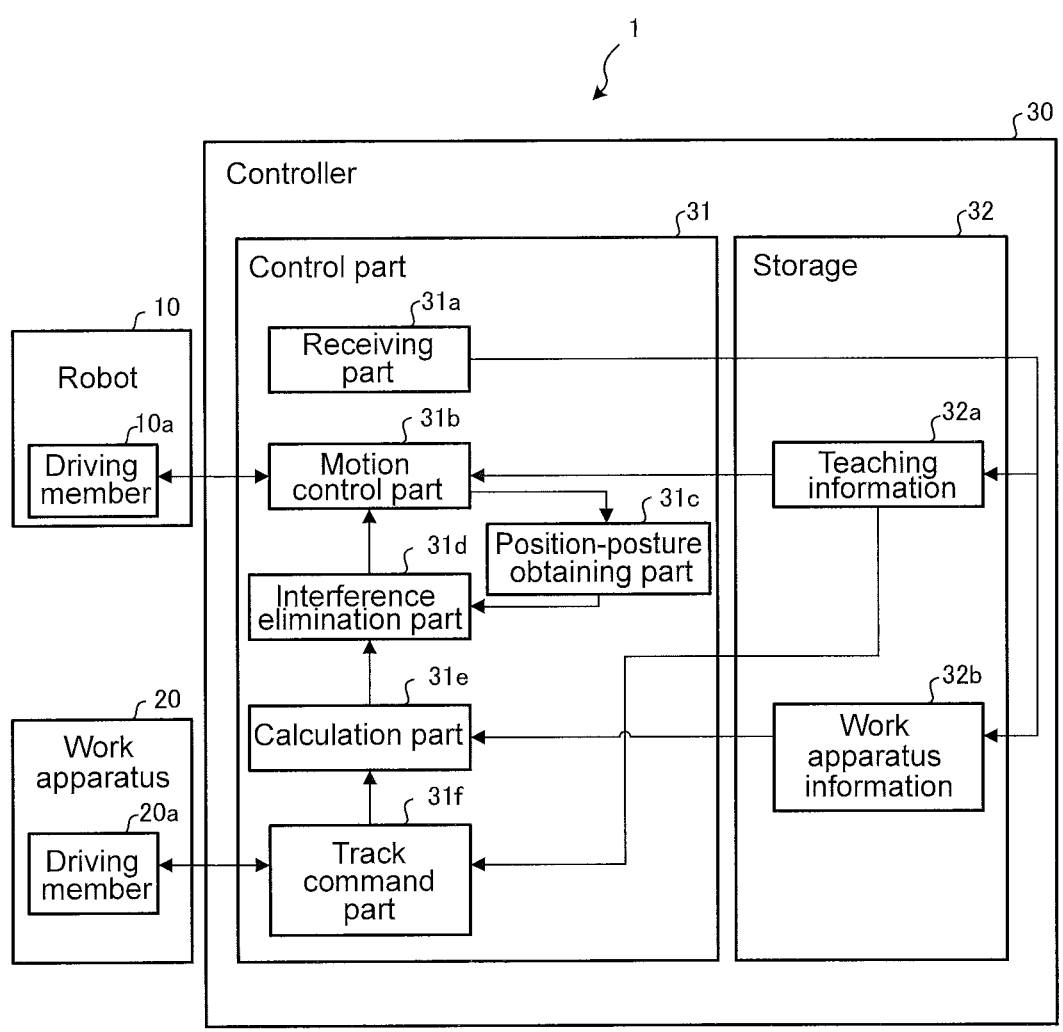
FIG. 5 is a block diagram illustrating a configuration of the robot system.

As illustrated in FIG. 5, the robot 10 includes driving members 10a. The driving members 10a correspond to the respective axes of the robot 10 illustrated in FIG. 2 (namely, the vertical axis A0, the first axis A1, the second axis A2, the third axis A3, the fourth axis A4, and the fifth axis A5). Each driving member 10a is a rotational actuator such as a servo motor and is controlled by the controller 30.

The work apparatus 20 includes the driving members 20a. The driving members 20a move the work module 500 illustrated in FIG. 3 relative to the work apparatus 20. While in this embodiment the driving member 20a is a rotational actuator such as a servo motor, the driving member 20a may be another type of actuator such as a linear motion actuator. The driving member 20a is synchronization controlled by the controller 30 so that the driving member 20a cooperates with the driving member 10a.

The controller 30 includes the control part 31 and a storage 32. The control part 31 includes a receiving part 31a, a motion control part 31b, a position-posture obtaining part 31c, an interference elimination part (interference elimination circuitry) 31d, a calculation part (calculation circuitry) 31e, and a track command part (track command circuitry) 31f. The storage 32 stores teaching information 32a and work apparatus information 32b.

The controller 30 includes a computer and various circuits. The computer includes a central processing unit (CPU), a read only memory (ROM), a random access memory (RAM), a hard disk drive (HDD), and input-output ports.

The CPU of the computer reads programs stored in the ROM and executes the programs to serve the functions of the receiving part 31a, the motion control part 31b, the position-posture obtaining part 31c, the interference elimination part 31d, the calculation part 31e, and the track command part 31f of the control part 31.

Also, at least one or all of the receiving part 31a, the motion control part 31b, the position-posture obtaining part 31c, the interference elimination part 31d, the calculation part 31e, and the track command part 31f may be implemented by hardware such as ASIC (Application Specific Integrated Circuit) and FPGA (Field Programmable Gate Array).

The storage 32 corresponds to the RAM and/or the HDD. The RAM and the HDD are capable of storing the teaching information 32a and the work apparatus information 32b. It is to be noted that the controller 30 may obtain the above-described programs and various kinds of information from another computer connected to the controller 30 through a wired or wireless network or from a portable recording medium. It is also to be noted that the controller 30 may be made up of a plurality of controllers synchronizable with each other, or may be implemented in a hierarchical configuration in which the controller 30 is communicable with an upper-level or lower-level controller.

The control part 31 controls the robot 10 and the work apparatus 20 to make motions in cooperation with each other. When the controller 30 is made up of a plurality of controllers, the control part 31 also performs processing of synchronizing the controllers 30 with each other.

The receiving part 31a receives the teaching information 32a and the work apparatus information 32b, and stores the teaching information 32a and the work apparatus information 32b in the storage 32. The motion control part 31b controls the robot 10 based on the teaching information 32a stored in the storage 32.

Also, the motion control part 31b improves the accuracy with which the robot 10 makes a motion by, for example, performing feedback control using encoder values from the driving member 10a of the robot 10. The teaching infatuation 32a is prepared in the teaching stage, in which the robot 10 and the work apparatus 20 are taught motions, and includes "jobs" that constitute a program defining a motion path of the robot 10.

The position-posture obtaining part 31c obtains, from the motion control part 31b, a position and a posture of the receiving surface 14bs of the robot 10, and forwards the obtained posture to the interference elimination part 31d. In the following description, the position of the receiving surface 14bs of the robot 10 will be occasionally referred to simply as "robot position", and the posture of the receiving surface 14bs will be occasionally referred to simply as "robot posture". Example postures of the robot 10 obtained by the position-posture obtaining part 31c will be described later by referring to FIGS. 6A and 6B.

Based on the force 100 (see FIG. 1) calculated by the calculation part 31e, the interference elimination part 31d causes the robot 10 to make an interference eliminating motion. The interference eliminating motion makes the work apparatus 20 move in a direction to cancel the force 100.

Specifically, the interference elimination part 31d instructs the motion control part 31b to make the robot 10 make the canceling motion 200 (see FIG. 1) by making the driving members 10a operate based on: the force 100 calculated by the calculation part 31e; and the posture of the robot 10 obtained by the position-posture obtaining part 31c.

The interference elimination part 31d also performs processing of changing, based on the posture of the robot 10, a gain (degree of contribution of the force 100 to the interference eliminating motion) used to convert the force 100 (see FIG. 1) into the interference eliminating motion. This will be detailed later by referring to FIG. 7.

The calculation part 31e calculates the force 100, which acts on the robot 10 when the work apparatus 20 makes a motion. Specifically, the calculation part 31e obtains a movement track command, which the track command part 31f outputs to the driving member 20a of the work apparatus 20. Also, the calculation part 31e obtains the work apparatus information 32b such that the work apparatus information 32b includes motion characteristics, weights, and/or other characteristics of the work module 500, the horizontal link mechanism 22, and the driving members 20a illustrated in FIG. 3. Then, the calculation part 31e calculates the force 100 (see FIG. 1) based on the movement track command and the work apparatus information 32b that has been obtained.

Thus, the calculation part 31e calculates the force 100, and the interference elimination part 31d makes the robot 10 make the interference eliminating motion based on the force 100 that has been calculated. This prevents the robot 10 from vibrating when the work apparatus 20 makes a motion, increasing the accuracy with which the work apparatus 20 performs work.

Specifically, the calculation part 31e calculates, based on the movement track command, the force 100 (see FIG. 1) acting on the receiving surface 14bs (see FIG. 2) of the robot 10. In this embodiment, the calculation part 31e calculates the force 100 using known inverse dynamics operations for the link mechanism. Then, the calculation part 31e converts the obtained force 100 from the xyz coordinate system, which is fixed to the work apparatus 20, into the XYZ coordinate system, which is fixed to the robot 10, thereby calculating the force 100 acting on the receiving surface 14bs of the robot 10.

Thus, the force 100 is calculated using a movement track command, which is equivalent to a motion instruction to the work apparatus 20. This ensures that vibrations are eliminated or minimized appropriately based on the movement of the work module 500 relative to the work apparatus 20.

It is to be noted that the force 100 includes a force having three degrees of freedom and a moment having three degrees of freedom, and that some of the degrees of freedom of the force and/or the moment may be disregarded in an attempt to reduce the load involved in the calculation of the force 100.

Based on track information, which is regarding a track of movement of the representative point 500p (see FIG. 3), the track command part 31f outputs a movement track command to the driving member 20a of the work apparatus 20. The track information is part of the teaching information 32a. That is, the track information is included in the teaching information 32a. The track command part 31f also outputs the movement track command to the calculation part 31e, as well as to the driving member 20a. The track information may be converted into the movement track command using inverse kinematics operations.

In order to prevent the interference eliminating motion of the robot 10 from delaying behind the motion of the work apparatus 20, the track command part 31f temporarily buffers the movement track command and outputs the buffered movement track command to the work apparatus 20. In this manner, the track command part 31f delays the motion of the work apparatus 20. Then or at the same time, the track command part 31f outputs the pre-buffered movement track command to the calculation part 31e. This ensures that the calculation of the force 100 by the calculation part 31e starts earlier than the actual motion of the work apparatus 20.

By delaying the movement track command to the work apparatus 20, the calculation of the interference eliminating motion starts earlier than the actual motion of the work apparatus 20. This eliminates or minimizes occurrence of such a situation that the interference eliminating motion of the robot 10 delays behind the motion of the work apparatus 20. The buffering of the movement track command will be described later by referring to FIG. 9.

Figure 6A:
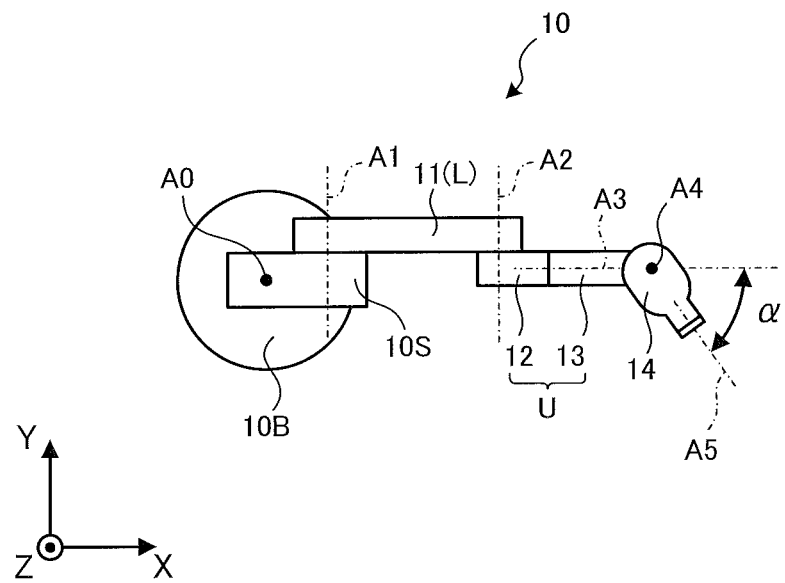
FIG. 6A is a schematic illustrating a first posture of the robot.
Figure 6B:
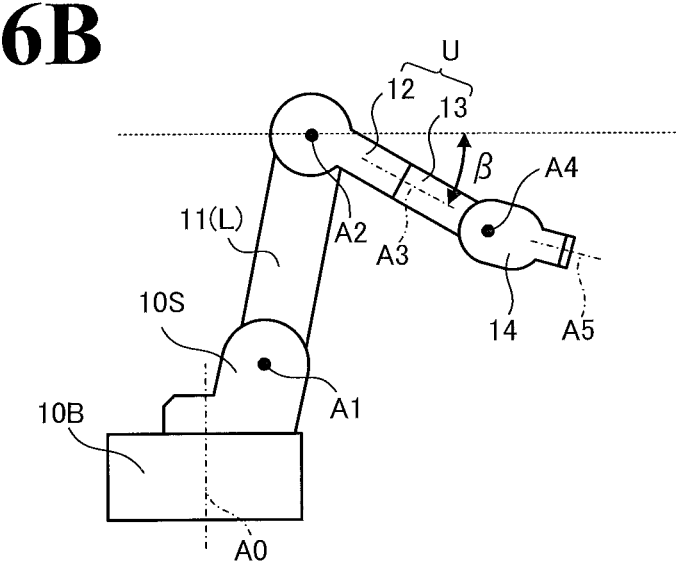
FIG. 6B is a schematic illustrating a second posture of the robot.

By referring to FIGS. 6A, 6B, and 7, description will be made with regard to the interference elimination part 31d's processing of changing, based on the posture of the robot 10, gains used to convert the force 100 (see FIG. 1) into the interference eliminating motion. FIG. 6A is a schematic illustrating a first posture of the robot 10; FIG. 6B is a schematic illustrating a second posture of the robot 10; and FIG. 7 illustrates example gain changes.

More specifically, FIG. 6A is a top view of the robot 10 as seen from the positive Z side, and FIG. 6B is a side view of the robot 10 as seen from the negative Y side, similarly to FIG. 1. As illustrated in FIG. 6A, $\alpha$ denotes swinging angle. As illustrated in FIG. 6B, $\beta$ denotes inclined angle. The swinging angle and the inclined angle are used to calculate the gains listed in FIG. 7.

The robot 10 illustrated in FIG. 6A is taking such a posture that the lower arm L (the first arm 11) extends along the X axis. Specifically, the lower arm L extends in the positive X direction in top view. In the posture illustrated in FIG. 6A, the first axis A1 and the second axis A2 are parallel to the Y axis. The upper arm U (the second arm 12 and the third arm 13) extends in the positive X direction, similarly to the lower arm L.

The swinging angle $\alpha$ is defined as the angle between the third axis A3 parallel to the X axis and the fifth axis A5. In the posture illustrated in FIG. 6A, the third arm 13 is turned about the third axis A3 to such a degree that the fourth axis A4 is parallel to the Z axis. The fourth axis A4, however, may not necessarily be parallel to the Z axis. Also in the posture illustrated in FIG. 6A, the third axis A3 is parallel to the X axis. The third axis A3, however, may be pointed in any other direction on the X-Y plane. Also in the posture illustrated in FIG. 6A, the swinging angle $\alpha$ is clockwise relative to the third axis A3. The swinging angle $\alpha$, however, may be counter-clockwise relative to the third axis A3.

As illustrated in FIG. 6A, the fifth axis A5 is turned by the swinging angle $\alpha$. In this case, the fifth axis A5 component of the external force of the work apparatus 20 (see FIG. 1) against the wrist 14 tends to be more influential to the vibration of the lower arm L and/or the upper arm U. Under the circumstances, it is preferable to make the gain corresponding to the vertical axis A0 and the gain corresponding to the first axis A1 vary depending on the swinging angle $\alpha$.

The robot 10 illustrated in FIG. 6B is taking such a posture that the upper arm U is inclined downward by the inclined angle $\beta$ relative to the X-Y plane (horizontal surface). The inclined angle $\beta$ is defined between the third axis A3 and the horizontal surface that passes through the second axis A2, about which the upper arm U swings (that is, the surface horizontal to the X-Y plane).

In such a posture that the upper arm U is inclined downward or upward relative to the horizontal surface, the external force that the wrist 14 receives from the work apparatus 20 (see FIG. 1) makes the fourth axis A4 susceptible to vibration. Under the circumstances, it is preferable to make the gain corresponding to the fourth axis A4 vary depending on the inclined angle β. While in FIG. 6B the inclined angle β is clockwise relative to the horizontal surface that passes through the second axis A2, the inclined angle β may be counter-clockwise relative to the horizontal surface.

FIG. 7 lists, in a tabular format: gains respectively corresponding to S axis (the vertical axis A0), L axis (the first axis A1), U axis (the second axis A2), and B axis (the fourth axis A4); and representative variables included in each gain where the gain is represented as a function including a variable(s). Referring to FIG. 7, gain (g) is represented as "g=f(x)" (f( ) is a function, x is a variable). The variable "Lx" is the horizontal distance between the vertical axis A0 and the fourth axis A4. It is to be noted that "Lx" may be the horizontal distance between the vertical axis A0 and a portion of the robot 10 farthest away from the vertical axis A0.

As illustrated in FIG. 7, gain "g0" of the S axis (the vertical axis A0) is a function with first variable Lx and second variable α. That is, g0 depends on Lx and α. It is to be noted that the function may be specified by a mathematical formula that returns a larger value when the first variable changes than when the second variable changes. This makes the change in the first variable more influential to g0 than the change in the second variable.

Gain "g1" of the L axis (the first axis A1) is a function with first variable Lx and second variable α. That is, g1 depends on Lx and α. It is to be noted that the function may be specified by a mathematical formula that returns a larger value when the first variable changes than when the second variable changes. This makes the change in the first variable more influential to g1 than the change in the second variable.

Gain "g2" of the U axis (the second axis A2) has no variables, as opposed to g0 and g1. That is, g2 can be regarded as a constant, which is not influenced by a particular variable. This is because the upper arm U is generally more rigid in structure, and also because the upper arm U is less influential to work accuracy than the S axis (the vertical axis A0) and the L axis (the first axis A1), since the upper arm U is closer to the leading end portion of the robot 10 than the S axis and the L axis are to the leading end portion of the robot 10.

Gain "g3" of the B axis (the fourth axis A4) is a function with first variable β and second variable α. That is, g3 depends on β and α. It is to be noted that the function may be specified by a mathematical formula that returns a larger value when the first variable changes than when the second variable changes. This makes the change in the first variable more influential to g3 than the change in the second variable.

Thus, gains used to convert the force 100 (see FIG. 1) into the interference eliminating motion are changed based on the posture of the robot 10. This enables the robot 10 to flexibly deal with vibration fluctuations that depend on the posture of the robot 10, and effectively minimize vibrations irrespective of the posture of the robot 10.

In FIG. 7, the third axis A3 and the fifth axis A5, which are turning axes among the six axes, are not dealt with. This is because these turning axes are less significant than the axes listed in FIG. 7 from a vibration prevention point of view. That is, it suffices that the interference eliminating motion of the robot 10 is performed using the axes listed in FIG. 7. It is to be noted, however, that the two turning axes may be added in the interference eliminating motion of the robot 10, so that a total of six axes are used.

Figure 8:
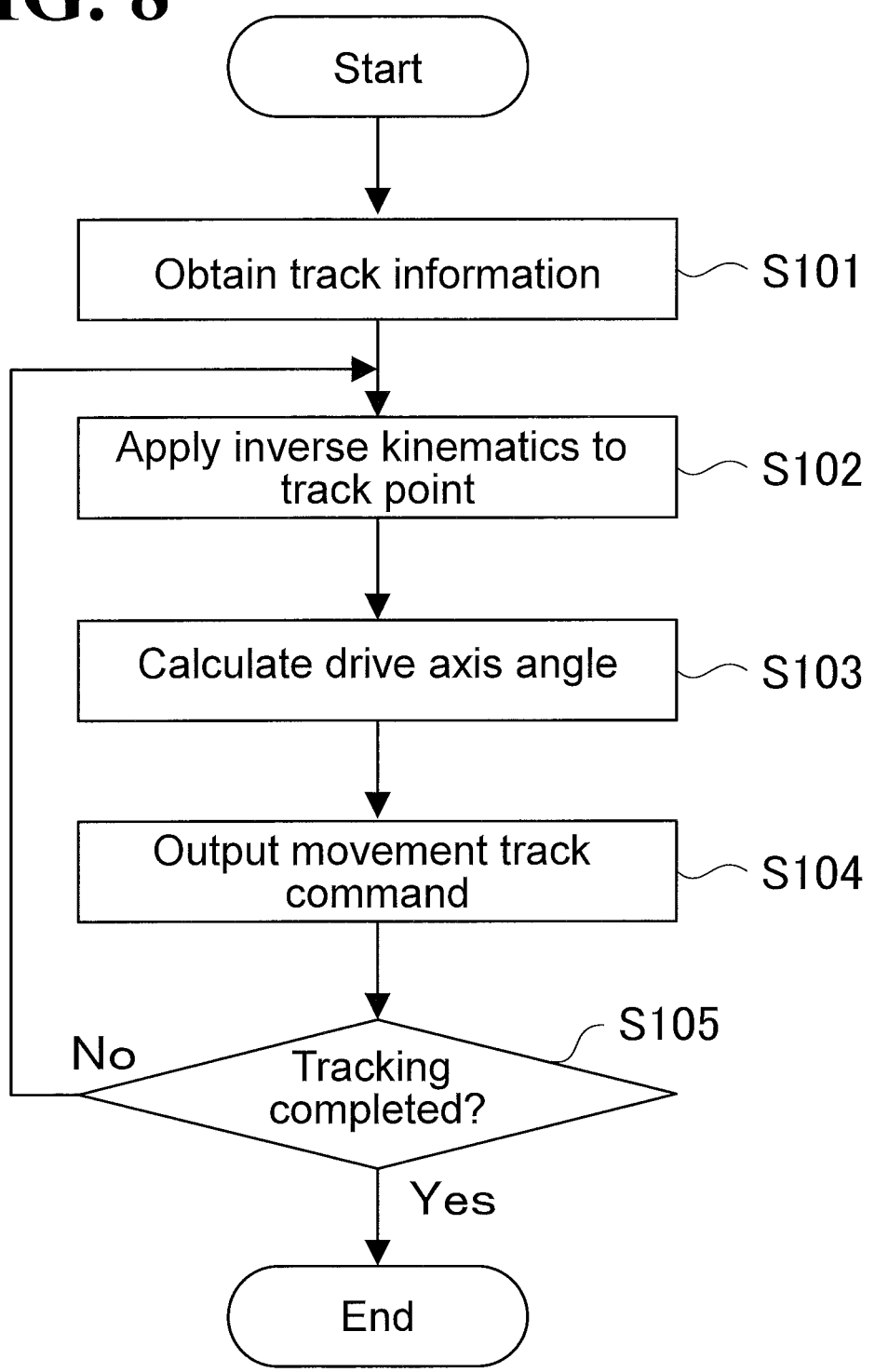
FIG. 8 is a flowchart of a procedure for track command processing.

By referring to FIG. 8, description will be made with regard to a procedure for track command processing performed by the controller 30 illustrated in FIG. 5. FIG. 8 is a flowchart of a procedure for the rack command processing. As illustrated in FIG. 8, the track command part 31f obtains track information from the teaching information 32a stored in the storage 32 (step S101).

Then, the track command part 31f applies inverse kinematics to a point on the track (step S102). In this manner, the track command part 31f converts the position information into a turning angle of the driving member 20a (see FIG. 5). Thus, a drive axis angle of the driving member 20a is calculated (step S103).

Then, the track command part 31f outputs a movement track command to the driving member 20a and the calculation part 31e (step S104). Then, the track command part 31f determines whether tracking in the track information is completed (step S105). When the tracking in the track information is completed (Yes at step S105), the entire processing ends. When the tracking in the track information is not completed yet (No at step S105), the processing at and after step S102 is repeated.

Figure 9:
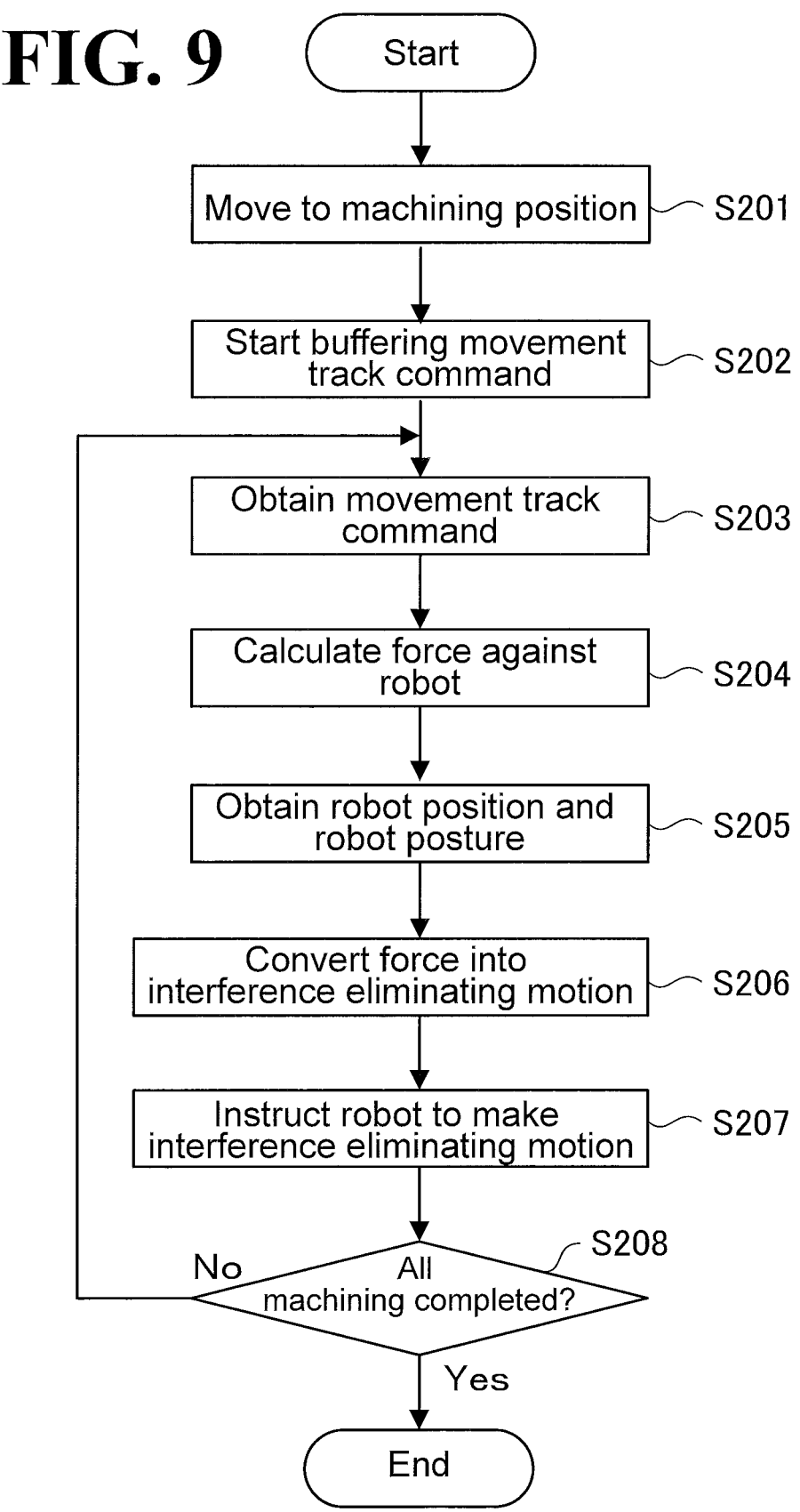
FIG. 9 is a flowchart of a procedure for non-interference processing.

By referring to FIG. 9, description will be made with regard to a procedure for non-interference processing performed by the controller 30 illustrated in FIG. 5. FIG. 9 is a flowchart of a procedure for the non-interference processing. As illustrated in FIG. 9, the motion control part 31b controls the robot 10 to move the work apparatus 20 to a desired machining or processing position (step S201).

Then, the track command part 31f starts buffering of a movement track command (step S202). Then, the calculation part 31e obtains the movement track command from the track command part 31f (step S203), and calculates the force 100 (see FIG. 1) against the robot 10 (step S204). Then, the interference elimination part 31d obtains a robot position and a robot posture from the position-posture obtaining part 31c (step S205), converts the force 100 into an interference eliminating motion (step S206), and instructs, through the motion control part 31b, the robot 10 to make the interference eliminating motion (step S207).

Then, the control part 31 determines whether all the machining or processing at the machining or processing position at step S201 is completed (step S208). When all the machining or processing is completed (Yes at step S208), the entire processing ends. When not all the machining or processing is completed yet (No at step S208), the processing at and after step S203 is repeated.

It is to be noted that the robot 10 may perform machining or processing while moving the work apparatus 20. In this case, the interference elimination part 31d operates the driving member 10a based on: the force 100 calculated by the calculation part 31e; and the latest robot position and the latest robot posture obtained by the position-posture obtaining part 31c. In this manner, the interference elimination part 31d instructs the motion control part 31b to cause the robot 10 to make a motion combination of the canceling motion 200 (see FIG. 1) and a movement motion determined in advance.

It is to be noted that the robot 10 and the work apparatus 20 repeat the procedure illustrated in FIG. 9 at all the machining or processing positions on a workpiece. Specifically, the robot 10 moves the work apparatus 20 to a machining or processing position determined in advance, and the work apparatus 20 performs machining or processing at the machining or processing position. Then, the robot 10 moves the work apparatus 20 to a next machining or processing position, and the work apparatus 20 performs machining or processing at the next machining or processing position. The robot 10 and the work apparatus 20 repeat this procedure.

Figure 10:
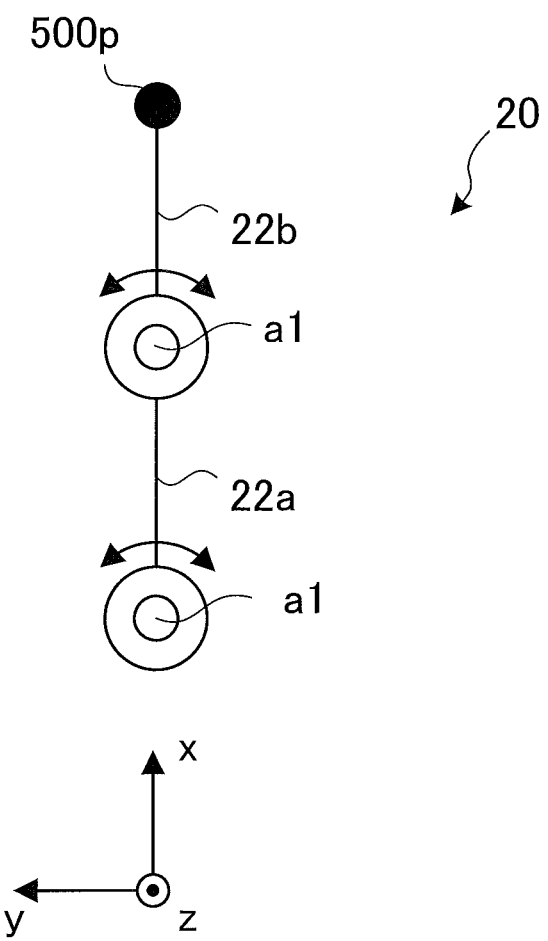
FIG. 10 is a schematic illustrating a modification of the work apparatus.

A modification of the work apparatus 20 illustrated in FIGS. 3 and 4 will be described by referring to FIG. 10. FIG. 10 is a schematic illustrating a modification of the work apparatus 20, and corresponds to FIG. 4. The work apparatus 20 illustrated in FIG. 10 is different from the work apparatus 20 illustrated in FIG. 4 in that the work apparatus 20 illustrated in FIG. 10 has an open link configuration, as opposed to the closed link configuration of the work apparatus 20 illustrated in FIG. 4. FIG. 10 is a top view of the work apparatus 20 as seen from the positive Z side, similarly to FIG. 4.

As illustrated in FIG. 10, the work apparatus 20 includes two drive axes a1. Each of the drive axis a1 is directly driven by driving force of the corresponding driving member 20a illustrated in FIG. 3.

Specifically, the base-side drive axis a1 is connected with the base end portion of the first link 22a, and the leading end portion of the first link 22a is connected with the leading-side drive axis a1. The leading-side drive axis a1 is connected with the base end portion of the second link 22b. It is to be noted that the leading end portion of the second link 22b corresponds to the representative point 500p.

Thus, the work apparatus 20 illustrated in FIG. 10 has an open link configuration with two joints connected to each other. The two drive axes a1 of the work apparatus 20 illustrated in FIG. 10 are parallel to the z axis, providing the work apparatus 20 with two degrees of freedom on the x-y plane. That is, the representative point 500p is movable to any position along the x-y plane. It is to be noted that the track of movement of the representative point 500p may take any of various shapes such as a circular shape, an elliptical shape, and a rectangular shape, similarly to the representative point 500p in the work apparatus 20 illustrated in FIG. 4.

As has been described hereinbefore, the robot system 1 according to the embodiment includes the work apparatus 20, the robot 10, and the controller 30. The work apparatus 20 makes the work module 500 move relative to the work apparatus 20 and performs work. On the robot 10, the work apparatus 20 is mounted.

The controller 30 performs synchronization control between the work apparatus 20 and the robot 10. The controller 30 includes the control part 31. The control part 31 controls the robot 10 to make a motion that cancels the force 100 against the robot 10 when the work module 500 moves relative to the work apparatus 20.

Thus, the robot 10 and the work apparatus 20 cooperate with each other in the robot system 1. This prevents the robot 10 from vibrating when the work apparatus 20 makes a motion, and, as a result, eliminates or minimizes degradation of the accuracy with which the work apparatus 20 performs work. This eliminates the need for providing the work apparatus 20 with an additional mechanism such as an anchor member and a vibration proof mechanism. As a result, the robot system 1 increases the accuracy with which the work apparatus 20 performs work without providing the work apparatus 20 with an additional mechanism.

In the above-described embodiment, the robot is controlled to make a motion that cancels a force of the work module against the robot when the work module moves relative to the work apparatus. This prevents the robot from vibrating, and increases the accuracy with which the work apparatus performs work. However, this configuration is not intended in a limiting sense; it is possible to use some other approach to increase the accuracy with which the work apparatus performs work.

A possible example is that, instead of preventing the robot from vibrating, a motion command to the work apparatus is corrected under the expectation that the vibration of the robot is transmitted to the work apparatus. Specifically, when the targeted shape of the motion track of the work module is a circular shape, it is possible to purposefully correct the motion command to the work apparatus such that the motion command specifies a shape that is different from a circular shape and that is changeable into a circular shape by the vibration of the robot. Thus, the corrected motion command to the work apparatus may be generated by subtracting a value corresponding to the vibration of the robot from the motion command corresponding to a circular shape.

Obviously, numerous modifications and variations of the present disclosure are possible in light of the above teachings. It is therefore to be understood that within the scope of the claims, the present disclosure may be practiced otherwise than as specifically described herein.

What is claimed as new and desired to be secured by Letters Patent of the United States is:

1. A robot system comprising:
   a work apparatus configured to move a work module relatively to the work apparatus, the work module being configured to perform work;
   a robot to which the work apparatus is connected; and
   control circuitry configured to control the robot to move so as to reduce a force generated by moving the work module by the work apparatus to eliminate or minimize vibration caused by movement of the work module by the work apparatus.

2. The robot system according to claim 1, wherein the control circuitry comprises
   calculation circuitry configured to calculate the force, and
   interference elimination circuitry configured to, based on the force calculated by the calculation circuitry, make the robot make an interference eliminating motion that makes the work apparatus move in a direction in which the force is canceled.

3. The robot system according to claim 2, wherein the calculation circuitry is configured to calculate the force based on a movement track command to the work apparatus about the work module.

4. The robot system according to claim 3,
   wherein the control circuitry comprises track command circuitry configured to output the movement track command to the work apparatus, and
   wherein the track command circuitry is configured to buffer the movement track command and configured to output the movement track command that has been buffered.

5. The robot system according to claim 4, wherein the interference elimination circuitry is configured to, based on a posture of the robot, change a gain used to convert the force into the interference eliminating motion.

6. The robot system according to claim 4,
   wherein the work apparatus comprises
      a horizontal link mechanism configured to support the work module and configured to make a representative point of the work module move along a first plane, and
      a driving member configured to drive the horizontal link mechanism, and
   wherein the calculation circuitry is configured to calculate the force based on work apparatus information regarding the work module, the horizontal link mechanism, and the driving member.

7. The robot system according to claim 6,
wherein the robot comprises a vertical multi-articular robot comprising an arm that has a receiving surface for the work apparatus at a leading end portion of the arm, and
wherein the work apparatus is mounted on the receiving surface such that a joint axis of the robot closest to the work apparatus is parallel to the first plane.

8. The robot system according to claim 3, wherein the interference elimination circuitry is configured to, based on a posture of the robot, change a gain used to convert the force into the interference eliminating motion.

9. The robot system according to claim 3,
wherein the work apparatus comprises
a horizontal link mechanism configured to support the work module and configured to make a representative point of the work module move along a first plane, and
a driving member configured to drive the horizontal link mechanism, and
wherein the calculation circuitry is configured to calculate the force based on work apparatus information regarding the work module, the horizontal link mechanism, and the driving member.

10. The robot system according to claim 9,
wherein the robot comprises a vertical multi-articular robot comprising an arm that has a receiving surface for the work apparatus at a leading end portion of the arm, and
wherein the work apparatus is mounted on the receiving surface such that a joint axis of the robot closest to the work apparatus is parallel to the first plane.

11. The robot system according to claim 2, wherein the interference elimination circuitry is configured to, based on a posture of the robot, change a gain used to convert the force into the interference eliminating motion.

12. The robot system according to claim 11,
wherein the work apparatus comprises
a horizontal link mechanism configured to support the work module and configured to make a representative point of the work module move along a first plane, and
a driving member configured to drive the horizontal link mechanism, and
wherein the calculation circuitry is configured to calculate the force based on work apparatus information regarding the work module, the horizontal link mechanism, and the driving member.

13. The robot system according to claim 2,
wherein the work apparatus comprises
a horizontal link mechanism configured to support the work module and configured to make a representative point of the work module move along a first plane, and
a driving member configured to drive the horizontal link mechanism, and
wherein the calculation circuitry is configured to calculate the force based on work apparatus information regarding the work module, the horizontal link mechanism, and the driving member.

14. The robot system according to claim 13,
wherein the robot comprises a vertical multi-articular robot comprising an arm that has a receiving surface for the work apparatus at a leading end portion of the arm, and
wherein the work apparatus is mounted on the receiving surface such that a joint axis of the robot closest to the work apparatus is parallel to the first plane.

15. The robot system according to claim 1, wherein the control circuitry is configured to control the robot to move so as to cancel the force.

16. The robot system according to claim 1, wherein the control circuitry comprises
calculation circuitry configured to calculate the force,
wherein the calculation circuitry is configured to calculate the force based on a movement track command to the work apparatus about the work module, and
wherein the calculation circuitry is further configured to calculate the force based on work apparatus information.

17. The robot system according to claim 16, wherein the work apparatus information includes weights of the work module.

18. The robot system according to claim 17, wherein the work apparatus information further includes motion characteristics of the work module.

19. The robot system according to claim 1, wherein the control circuitry is configured to control the robot to move so as to reduce the force generated by moving the work module by the work apparatus by performing synchronization control between the work apparatus and the robot.

20. The robot system according to claim 1, wherein the work apparatus is configured to perform laser machining, spraying of liquid, spraying of gas, coating, or welding.

* * * * *